United States Patent

[11] 3,543,902

| [72] | Inventors | Shu Tsuji<br>21-5 3-chome, Honda, Kokubunji-shi, and<br>Hiroshi Tsuji, 1318-8, Shimofuda, Chofu-<br>shi, Japan |
|---|---|---|
| [21] | Appl. No. | 760,279 |
| [22] | Filed | Sept. 17, 1968 |
| [45] | Patented | Dec. 1, 1970 |
| [32] | Priority | Feb. 13, 1968, June 5, 1968, June 5, 1968 |
| [33] | | Japan |
| [31] | | Nos. 43-9039, 43-38500 and 43-38501 |

[54] TORQUE TRANSMISSION SYTEM
6 Claims, 16 Drawing Figs.

| [52] | U.S. Cl. | 192/150;<br>91/458 |
|---|---|---|
| [51] | Int. Cl. | F16p 3/00;<br>F15b 13/04 |
| [50] | Field of Search | 91/458;<br>192/56, 150 |

[56] References Cited

UNITED STATES PATENTS

| 2,718,879 | 9/1955 | Rice et al. | 91/458X |
| 3,026,855 | 3/1962 | McRae | 91/458 |
| 3,220,525 | 11/1965 | Pauley | 192/150 |
| 3,406,762 | 10/1968 | Kramer | 192/150X |
| 3,421,414 | 1/1969 | Peale | 91/458 |

*Primary Examiner*—Arthur T. McKeon
*Attorney*—Mc Glew & Toren

ABSTRACT: A torque control device is made up of an inlet element to which the torque is supplied. an outlet element which applies the torque, and toggle means operatively interposed between them for discontinuing the application of the torque when a predetermined value is attained. Through a connecter member the toggle means can regulate the supply of compressed air to a speed control valve for discontinuing the application of input power. The valve is arranged to supply the compressed air in variable amounts to an air motor in relationship to the output torque required.

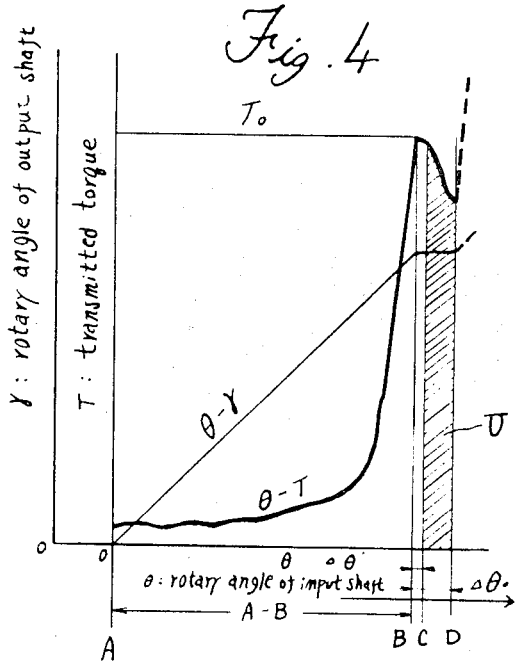
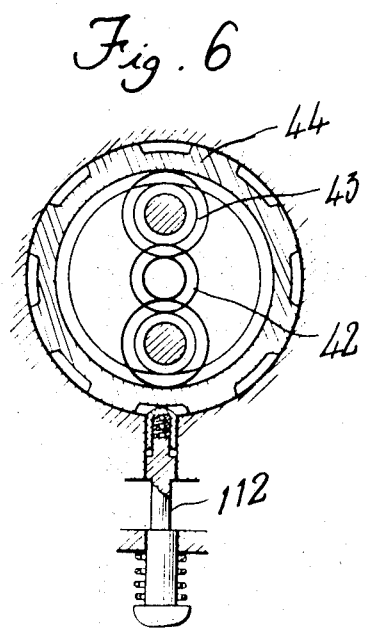
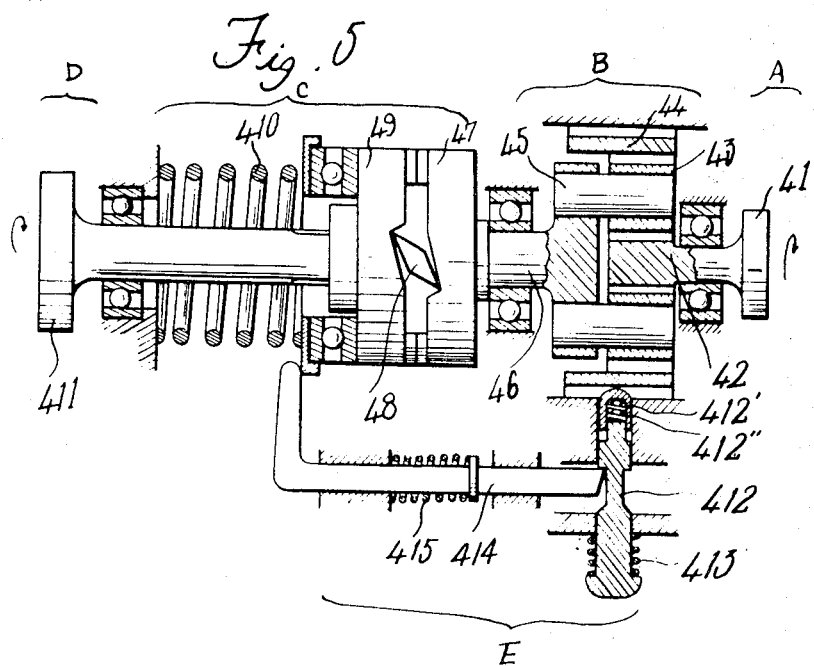

TORQUE TRANSMISSION SYTEM

This invention relates to a torque transmission system, including a torque control device as well as a torque cutoff device.

The torque transmission system of a power type, using an electric motor or air motor and used as a clamping tool for bolts and nuts or screws and the like, has been hitherto contrived in several kinds, however, it has been difficult to keep the clamped torque accurately constant.

Also, in usual torque transmission systems, several methods for cutting off the torque have been contrived to detect the value of torque and to maintain it or to add a constant force when it reached a certain value. However, in these systems, wherein the torque is detected and the power sources, for instance, an electric source for an electric motor, an air source for an air motor and an oil pressure source for an oil pressure motor are cutoff, it is feared that a large torque is generated temporarily and predetermined torque value is exceeded due to large inertia force of the power source, when the output portion is suddenly stopped.

In a system for cutting off the torque, a clutch and its cutoff mechanism must be included in the rotary portion, thus the construction becomes inevitably complicated and has disadvantages in that wearing portions and the like are increased, because the off and on action of the clutch are operated from the outside.

Therefore, the object of the present invention is to provide a torque transmission system having a torque control device, which enables more accurate controlling of the transmitted torque for clamping tools and the like.

The present invention has also as one of its objects to eliminate the disadvantages of usual torque cutoff devices. And, such an object has been attained by adopting a cutoff system for torque transmission which releases the locking of stopped portion by means of planetary gears.

Another object of the present invention is to provide a new speed control valve for the supply pipe delivering compressed air to an air motor used in the torque transmission system.

The present invention will be explained in detail in conjunction with accompanying drawings, as follows.

In the drawings:

FIG. 1 is a sectional view, showing an embodiment of a torque transmission system according to the present invention. FIG. 2 is a diagrammatic illustration of the main parts of the torque transmission system according to the present invention, when the system is applied to a power type bolt clamping tool.

FIGS. 3a, 3a', 3b, 3b', are drawings, showing the principle of a torque control device in the torque transmission system of the present invention. FIG. 4 is a graph, showing the relationship between the rotary angle of the output shaft as well the transmitted torque and the rotary angle of the input shaft of the torque control device.

FIG. 5 shows an example of a torque control device having a cutoff device in the torque transmission system embodying the present invention. FIG. 6 is a section of the planetary gears portion in FIG. 5.

Figure 1:
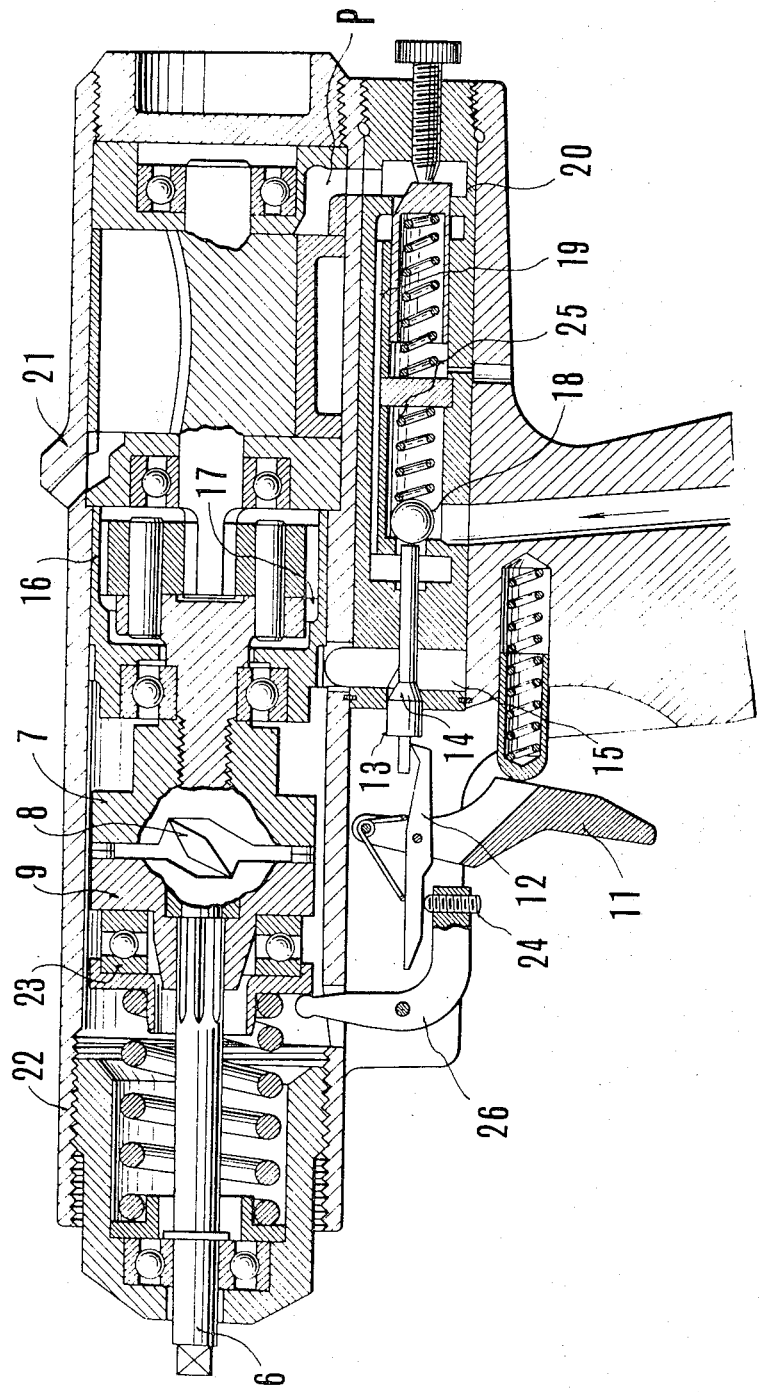

Now, FIG. 1 is an embodiment, wherein the torque transmission, according to the present invention, is used in a compressed air type clamping tool for power tightening a screw member, and the explanation of operation thereof now follows.

First of all, when a trigger 11 is pulled, a stop valve rod 13 is pushed to the right by a lever 12 attached to the trigger with a pin, and by means of a tapered portion 14 of the stop valve rod, a clutch rod 15 is pushed upwardly and locks a ring gear 17 of a planetary gears device 16. Further, the stop valve rod 13 pushes open a ball valve 18 of a stop valve to introduce compressed air, which will enter a speed control valve 20 through a small hole 19 and flow out from narrow clearance of the valve to enter a vane-type air motor 21. Owing to the narrow clearance of the speed control valve, said vane-type air motor 21 is so limited that its number of revolutions does not increase excessively.

The output passes through the planetary gears device 16 and is transmitted to a torque control portion 22 which includes a toggle mechanism. At this time, because the ring gear of the planetary is fixed to the clutch rod, as mentioned above, the torque of the vane-type air motor will be several times.

The torque is transmitted through a toggle rest 7, the toggles 8 arranged on the periphery and a toggle seat 9, to the output shaft 6 to rotate a paired nut. Until the nut rotates on the bolt and seats itself thereon, the torque is not so much needed and the nut will rotate intact. Once the nut seats on the bolt, the nut clamping torque will suddenly increase, so that the vane-type air motor rotates very slowly and the pressure (P) in the motor will rise, accordingly, the speed control valve 20 will open to increase the output torque of vane-type air motor. When the torque increases further, the axial force of the toggles 8 will overcome the spring force, which has been set for a predetermined force, and the toggle seat 9 will move slightly to the left. This slight movement of the toggle seat 9 will rotate a pivotally mounted stopper 26 by means of a thrust bearing 23.

On the opposite end of the stopper, an adjusting screw 24 is positioned. When the stopper 26 is pivoted by the movement of toggle seat, the lever 12 is pushed up on one end by the adjusting screw 24 and, a pawl on the other end of the lever 12 will be lowered to disengage the stop valve rod 13, which will then be pushed back to the left by the force of stop valve spring to close the stop valve, thus cutting off the supply of compressed air.

Further, due to the movement of the stop valve rod 13 the clutch rod 15 drops downwardly to disengage the locking of the ring gear, so that the rotation of the air motor, due to inertia, is not transmitted to the output shaft so as not to clamp the nut excessively.

When the trigger 11 is released, the original state is restored as shown in FIG. 1.

Figure 2:
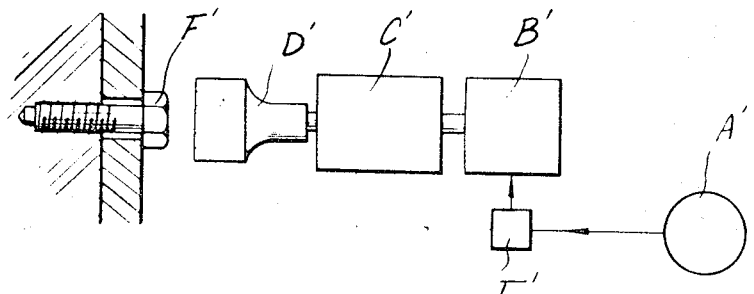

As shown in FIG. 2, the power from a power source A' for instance, an electric source or a compressed air tank, is transmitted to a motor B' for instance, an electric motor including a suitable reduction gear, or to an air motor, through a cutoff portion E' for instance, a switch or a valve. The output torque is transmitted to a bolt clamping tool D' through a torque control device C' to clamp bolts, nuts, screws and the like F'. When the torque passing through the torque control device C' attains a prescribed torque value, the clamping torque may be easily kept constant in principle, by actuating the cutoff portion E' or the clutch between the motor B' and the torque control device C' as shown in FIG. 2.

But, in this system, it is difficult to keep the clamping torque accurately constant for the following reasons.

1. Accuracy of the torque control portion is defective.
2. Time lag from the detection of torque to the cutting off the cutoff portion or the delay of operation of the cutoff portion due to mechanical play results in an excessive torque.
3. Excessive torque due to inertia energy of motor portion, torque control portion and the like.

The torque control device according to the present invention has been contrived for the purpose of removing these disadvantages.

Figure 3A:
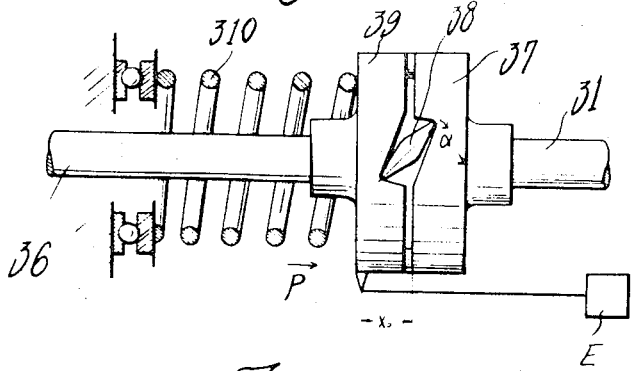
Figure 3A:
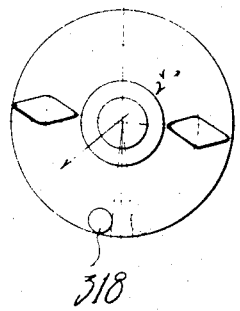
Figure 3B:
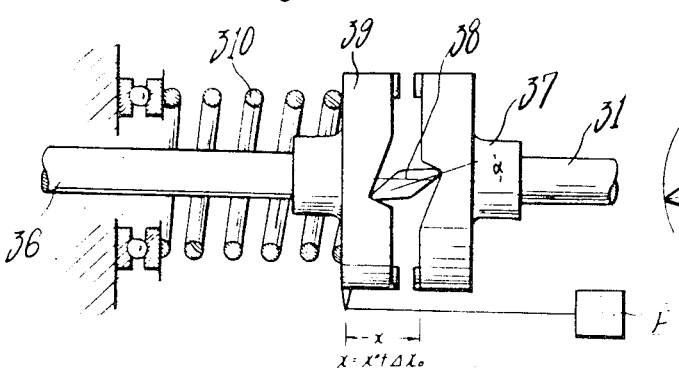
Figure 3B:
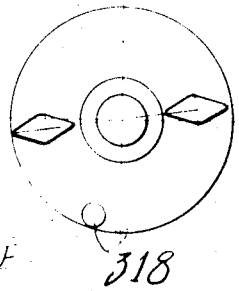

Now, the system will be explained with respect to an embodiment shown in the drawings. In FIGS. 3a and 3b, the torque from an input shaft 31 passes from a toggle rest 37 to toggles 38 and is transmitted to a toggle seat 39, then passes into an output shaft 36. For prescribing the operation torque of the toggles 38, the toggle seat 39 is pushed by a spring 310. And a cutoff portion E is made operative by the movement of the toggle seat 39 against the action of the spring 310.

Further, in FIGS. 3a and 3b two toggles 38 are used, but one or three or more toggles may be used.

In the torque control device shown in FIG. 3 a, when the torque entering by means of the input shaft 31 does not attain to the prescribed torque To the torque passes through the toggles 38 and is transmitted to the toggle seat 39 and then to the output shaft 36 with the same rotation angle as the input shaft 31 (between A and B in FIG. 4). When this transmitted torque attains to the prescribed torque (*the torque passes through the toggles 38 and is transmitted to the toggle seat 39 and then to the output shaft 36 with the same rotation angle as the input shaft 31 (between A and B in FIG. 4). When this transmitted torque attains to the prescribed torque (To) the toggles 38 begin to stand up and the toggle angle $\alpha$ becomes smaller, as shown in FIG. 3b*, but the output shaft will not rotate until the stopper 318 operates (between B and D in FIG. 4). And the torque during this interval becomes smaller than the prescribed torque ($T_o$), as described hereinafter. To, The relation between the spring force P, the transmitted torque and the toggle angle $\alpha$ is formulated as $$T = P \cdot r \cdot \tan \alpha \qquad 1$$

where $\gamma$; effective radius of toggles, then, the prescribed torque $T_o$ is $$T_o = P \cdot r \cdot \tan \alpha_o \qquad 2$$

Namely, when the toggle begins to stand up, $\alpha$ becomes smaller and the torque T becomes smaller than the torque $T_o$.

By means of this system, the torque may be controlled with the accuracy of within 1 percent. Also, the cutoff portion E may be operated by utilizing the movement $\Delta x_o$ of the toggle seat 39. At this time, even though time lag and delay of operation are existing, if these are operating between B and C $\Delta O \theta$ in FIG. 4, namely, if $\Delta O\ \theta > O'$ the output does not rotate and the torque T is smaller than the prescribed torque $T_o$.

Further even though a torque is generated by the inertia of torque control portion, if its kinetic energy K is smaller than the potential energy Y of the spring, which may be absorbed until the end of toggle operation (point D in FIG. 4), the transmitted torque T do not exceed the prescribed torque $T_o$.

Namely, the kinetic energy K is $$K = \frac{1}{2} J_o \omega^2 \qquad 3$$

where,

J: equivalent moment of inertia on the input shaft,
$\omega_o$: angular velocity at the time of cutting off on the input shaft.

On the other hand, the potential energy of the spring in consideration of the delay of $\Delta \theta'$ is (the portion covered by hatching in FIG. 4)

$$U = \int_{\beta + \Delta \sigma'}^{c} T d\sigma = \left(P + \frac{\Delta x_o + \Delta x'}{2} k\right)(\Delta x_o - \Delta x') \qquad 4$$

where,
P: spring force
k: spring constant
$\Delta x_o$: total compression of spring, when the toggle operates
$\Delta x'$: compression of spring corresponding to the delay ($\Delta \sigma'$)

from the formula 3 and 4, following formula may be obtained $$\left(P + \frac{\Delta x_o + \Delta x'}{2} k\right)(\Delta x_o - \Delta x') > \frac{1}{2} J_o \omega^2 \qquad 5$$

To satisfy this formula and as shown in FIG. 4, if the delay is absorbed during the former half (interval B C) and the cutting off is effected and the kinetic energy of motor is absorbed during the latter half (interval C D), errors due to time lag, delay of operation and inertia will not be caused. And, the accuracy of torque detection for the toggle may be made within 1 percent, so that a torque control device having sufficient accuracy may be obtained.

In the next place, the torque cutoff device will be explained with regard to the embodiment shown in the drawings.

Figure 7:
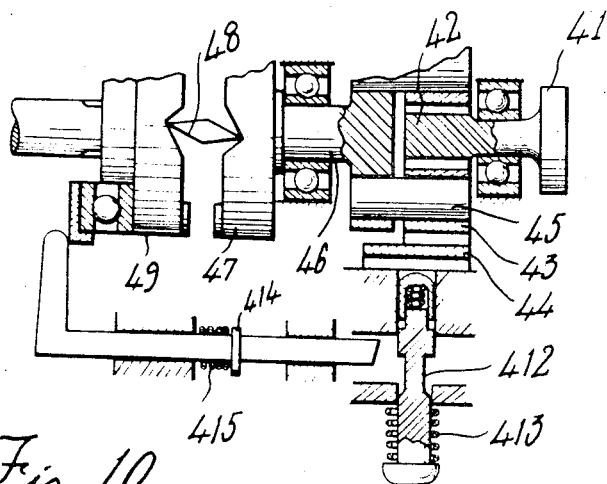
FIG. 7 is a view, similar to FIG. 5, showing the moved state of the cutoff device in FIG. 5.

The torque control device shown in FIG. 5 to FIG. 7 may be roughly divided into five portions, i.e. input portion A, planetary gears portion B, torque detecting portion C, output portion D and torque cutoff portion E.

The transmitted torque enters from an input flange 41 of A portion and is transmitted to a sun gear 42 to drive planetary pinions 43. The planetary pinions 43 are fixed with ring gears 44, so that they make planetary motions within inner gear thereof to drive a planetary pin 45, thus the torque is transmitted to a shaft 46.

The torque detecting portion C of this drawing is an example of the previously described movement of the toggle, wherein the torque is transmitted from the toggle rest 47 to the toggle seat 49 passing through several toggles 48 arranged on the periphery. The toggle seat 49 is pushed by means of a spring 410 with a predetermined force, and when the transmitted torque attains a predetermined value, the toggle becomes to stand up. The torque transmitted to the toggle seat 49 is then transmitted to an output flange 411.

The cutoff portion E cooperates with the detecting portion C using the toggle, and the rotation of ring gear 44 of the planetary gears portion 43 is stopped by a stop pin 412. The stop pin 412 is locked by means of a cutoff lever 414, and when the toggle seat 49 is moved to the left by the standing up of toggles 48, the locking is released and the stop pin 412 is disengaged by the force of spring 413, thus the ring gear 44 becomes rotatable (FIG. 7). Since the cutoff lever 414 is urged against the action of the toggle seat 49 by means of a spring 415, if the toggle seat 49 restored its original position, by pushing up the stop pin 412 again, the stop pin 412 is locked by the cutoff lever 414 thus the ring gear 44 is fixed. At this time, a spring 412" is housed within a head 412' of the stop pin so that the tip of the stop pin 412 may easily enter in the recess of the ring gear 44.

Namely, in the present invention, the planetary gears include three rotary motions, i.e. the rotation of sun gear 42 the planetary motion of planetary pinions 43 and the rotation of ring gears 44, as shown in FIG. 6, and if two of which are made as input shafts and remained one is fixed, then the torque is transmitted with increased or decreased state.

FIG. 5 is an example, wherein the sun gear 42 is made as an input shaft, the planetary pinions 43 as an output shaft and the ring gears 44 are fixed. Now, if the fixed portion is released, the torque of input shaft will be no more transmitted to the output portion. If by releasing the ring gears from the fixed position, the torque is cutoff, the cutoff device may be installed on the portion which is being stopped. The construction of the cutoff portion becomes simple and has no wearing portion, and if connected again after cutting off, the operation may be easily effected. FIG. 5 is an example therefor, wherein the movement of torque detecting portion C (in this FIG., the standing up of the toggle 48 is used, however, not always limited in this method) is transmitted to the cutoff lever 414, by which movement the locking of stop pin 412 is released, thus the torque may be easily cut off.

And, since the inertia of gears to be fixed may be made small, the torque due to any shock may be kept to valve, small valve even though the output portion is suddenly stopped.

When the power source is cutoff by a signal from the torque detecting portion at the same time, the input portion may be also stopped without causing any shock, because the input portion may be slowly stopped, even if the output portion is suddenly stopped.

The time lag until the starting of the cutoff device after the signal is sent can be absorbed by the toggle spring as explained hereinbefore.

In the following, a speed control valve for an air motor used for the torque transmission system of the present invention will be explained about FIG. 8 to FIG. 13.

Figure 8:
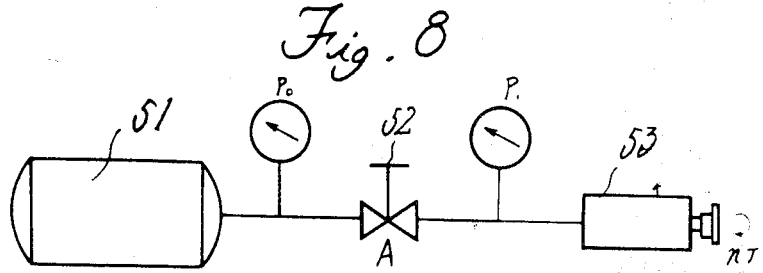
FIG. 8 is a diagrammatic illustration of the correction between an usual air motor and its power source.

FIG. 8 shows diagrammatically the connection of a conventional air motor system, wherein compressed air under pressure $P_1$ is supplied to an air motor 53 from an original air reservoir 51 under pressure $P_o$ through a valve 52 having opened valve area A, and from the air motor 53, the output torque T, the power having a number of revolutions $n$, is obtained.

Figure 9:
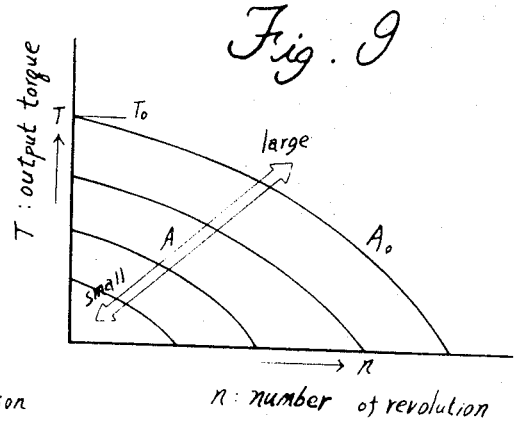
FIG. 9 is a graph showing the relationship between the output torque and the number of revolutions, when the area of valve opening of FIG. 8 is varied.

The characteristics of such an air motor, for instance a vane-type air motor, is that when the opened valve area A of the valve 52 is constant, the number of revolutions $n$ will increase as the output torque T decreases and the number of revolutions $n$ will decrease as the output torque increases, as shown in FIG. 9. Now, in order to make smaller the number of revolutions $n$ for no load (T = 0), the opened valve area A is made smaller as, for instance, the lowest curve in FIG. 9, then the output torque T becomes considerably small compared with the maximum torque ($T_o$) when the opened valve area A is maximum (A=0 $A_o$), even though load is born.

In this manner, if the opened valve area A is made smaller for the purpose of controlling the number of revolutions at no load or light load, the output torque of air motor will be decreased. It is very troublesome to control the opened valve area A manually in response to the condition of load.

This invention has been made to remove such troubles and its essential points consist in a speed control valve of an air motor, characterized in that the number of revolutions at no load or light load is controlled, a throttle valve is arranged on a part of a supply line of compressed air so as not to decrease output torque the throttle valve is made to increase the opened valve area sufficiently due to the increase of pressure behind the valve, and the minimum opened valve area is assured even though the pressure behind the throttle valve decreases less than a certain value, further the dimensions of this minimum opened valve area is made adjustable to control the number of revolutions at no load.

Figure 13:
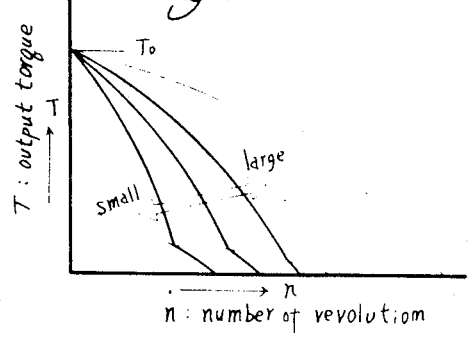
FIG. 13 is a graph, showing the relationship between the output torque and the number of revolutions of an air motor, when the speed control valve of FIG. 11 is used instead of the valve in FIG. 8.

Thereupon, if the speed control valve (FIG. 11) according to this invention is used instead of an ordinary throttle valve (52 in FIG. 8), even though the number of revolutions at no load or light load is decreased, in case the load is increased, the opened valve area A is automatically increased and the maximum torque $T_o$ may be obtained, as shown in FIG. 13.

Figure 11:
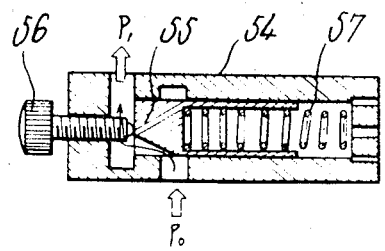
FIG. 11 is a sectional view, of a speed control valve according to the present invention.

FIG. 11 is an example of speed control valve according to the present invention, wherein the compressed air enters into the valve body 54 from below and flows through a passage between the valve body 54 and the valve 55 and comes out from upper portion, as shown by an arrow. In the valve 55, the minimum opened valve area $A_s$ is kept, even though the pressure ($P_1$) behind the valve is decreased less than a certain degree.

The characteristics of the speed control valve in FIG. 11 is that the opened valve area A is varied due to the pressure ($P_t$ behind the valve, and when the pressure ($P_1$ becomes maximum ($P_1$= $P_o$), the opened valve area A will become maximum T, A. And, when the pressure $P_1$ behind the valve decreases less ($P_1$ certain degree ($P_t$<$P_s$), the opened valve area A will be kept constant (A =$A_s$).

Figure 10:
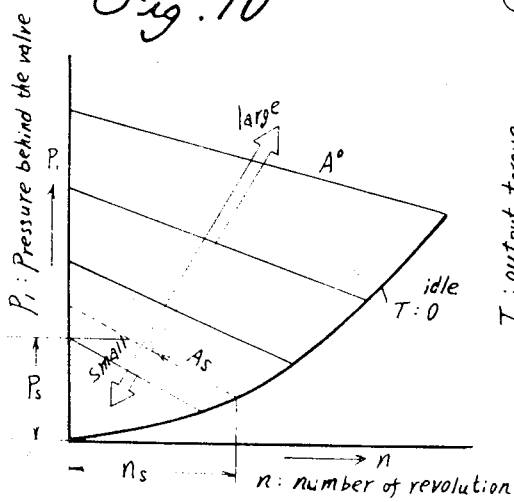
FIG. 10 is a graph, showing the relationship between the pressure behind the valve and the number of revolutions, when the area of valve opening of FIG. 8 is varied.

If such a valve is inserted instead of the valve 52 of FIG. 8, the number of revolutions at no load is suppressed as $n = n_s$ as shown in FIG. 10, and under these conditions, the load is increased to increase the output torque T, and when the number of revolutions $n$ decreases, the pressure $P_1$ behind the valve will increase, and when it attains to $P_1$ =$P_s$, the valve begins to open and the opened valve area A will increases. When the opened valve area A becomes larger, the pressure $P_1$ behind the valve is further increased to enlarge the opened valve area A still more, thus the output torque T may become larger until it reaches a necessary value. The maximum torque thereof may be made so as to reach the same value as that when the valve is fully opened.

Figure 12:
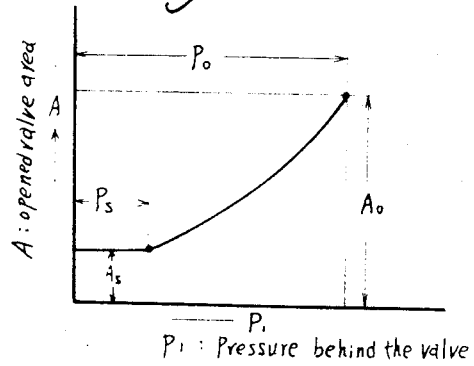
FIG. 12 is a graph, showing the relationship between the pressure behind the speed control valve and the area of the valve opening.

When the load decreases under these conditions, the number of revolutions $n$ of the air motor increases and the pressure $P_1$ behind the valve decreases, as shown in FIG. 10. When the pressure $P_1$ behind the valve decreases the opened valve area A decreases, as shown in FIG. 12, further the pressure $P_1$ behind the valve decreases and the opened valve area A becomes still smaller until it reaches $P_t - P_s$, and the opened valve area A becomes as A = $A_s$, thus the number of revolution $n$ may be controlled as $n = n_s$. Since the minimum opened valve are $A_s$ in the speed control valve of FIG. 11 is made variable by means of an adjusting screw 56 against a spring 57, the characteristics of air motor using the speed control valve according to this invention is that the number of revolutions at no load or light load may be controlled at an optional value, as shown a by full line in FIG. 13, and also the maximum torque $T_o$ may be obtained.

We Claim:

1. A torque control device for a torque transmission system using a source of power such as compressed air and the like, comprising torque input means, means for applying torque, a torque control means interposed between and operatively engaged to said torque input means and torque applying means, said torque control means comprising an inlet element, and outlet element, and toggle means disposed between said inlet element and outlet element, means for maintaining said inlet element, outlet element, and toggle means in operative engagement for transmitting torque from said input means to said applying means, and said toggle means arranged to overcome said means for maintaining said torque control means in operative engagement for discontinuing the application of torque when a maximum torque value has been reached.

2. A torque control device, as set forth in claim 1, wherein said torque input means comprises a planetary gear system comprising a sun gear and arranged to be connected to source of input rotational motion, planetary pinions engaging and disposed about said sun gear and arranged to transmit the rotational motion to said inlet element of said torque applying means, and a ring gear in engagement with and encircling said planetary pinions, and means for locking said ring gear whereby when said ring gear is locked the rotational motion is transmitted through said sun gear and planetary pinions to said torque applying means and when said ring gear is released the driving action of said planetary gears is discontinued.

3. A torque control device, as set forth in claim 2, wherein said means for locking said ring gear comprises a member mounted laterally outwardly of said ring gear and arranged to be displaced inwardly into locking engagement with said ring gear.

4. A torque control device, as set forth in claim 3, wherein said means for locking said ring gear comprises spring means operatively engaging said member and urging said member outwardly from said ring gear.

4. A torque control device, as set forth in claim 4, wherein means operatively engaging said torque applying means are arranged to displace said means for locking said ring gear out of locking engagement when the application of the torque is discontinued.

6. A torque control device, as set forth in claim 1, wherein said means for maintaining said torque applying means in operative engagement comprising a spring member in contact with said outlet element and urging said outlet element toward said inlet element whereby said toggle means are maintained in position therebetween for the transmission of torque from said inlet element through said toggle means to said output element.